United States Patent
Behnke et al.

(10) Patent No.: US 12,331,943 B2
(45) Date of Patent: Jun. 17, 2025

(54) EXHAUST FAN

(71) Applicant: Hubbell Incorporated, Shelton, CT (US)

(72) Inventors: Peter Behnke, Vernon, CT (US); Benjamin Sigg, Wethersfield, CT (US); Nick Graham, Bloomfield, CT (US)

(73) Assignee: Hubbell Incorporated, Shelton, CT (US)

( * ) Notice: Subject to any disclaimer, the term of this patent is extended or adjusted under 35 U.S.C. 154(b) by 374 days.

(21) Appl. No.: 17/775,949

(22) PCT Filed: Nov. 10, 2020

(86) PCT No.: PCT/US2020/059841
§ 371 (c)(1),
(2) Date: May 11, 2022

(87) PCT Pub. No.: WO2021/096862
PCT Pub. Date: May 20, 2021

(65) Prior Publication Data
US 2022/0390132 A1     Dec. 8, 2022

Related U.S. Application Data

(60) Provisional application No. 62/933,674, filed on Nov. 11, 2019.

(51) Int. Cl.
*F24F 11/00* (2018.01)
*F24F 11/56* (2018.01)
(Continued)

(52) U.S. Cl.
CPC ......... *F24F 11/0001* (2013.01); *F24F 11/56* (2018.01); *F24F 11/77* (2018.01); *F24F 2110/20* (2018.01); *F24F 2110/50* (2018.01)

(58) Field of Classification Search
CPC ......... F24F 11/0001; F24F 11/56; F24F 11/77
See application file for complete search history.

(56) References Cited

U.S. PATENT DOCUMENTS 6,359,564 B1 * 3/2002 Thacker ................. G08B 21/22
                                                       340/331
10,001,288 B1    6/2018 Yang
(Continued)

FOREIGN PATENT DOCUMENTS

WO    WO-2006009171 A1 * 1/2006 ......... F24F 11/0034
WO    2020167839 A1    8/2020

OTHER PUBLICATIONS

International Search Report and Written Opinion mailed in Application No. PCT/US2020/059841, dated Feb. 5, 2021.

*Primary Examiner* — Mark A Connolly
(74) *Attorney, Agent, or Firm* — Robinson + Cole LLP

(57) ABSTRACT

An exhaust fan for a space is provided. The exhaust fan includes a vent and a plurality of blades. The exhaust fan further includes a fan motor operatively coupled to the plurality of fan blades. The fan motor is configured to drive rotation of the plurality of fan blades to draw air within the space through the vent. The exhaust fan includes a microphone and a sensor. The sensor is configured to detect one or more parameters of the air. The exhaust fan further includes one or more control devices. The one or more control devices are configured to obtain, via the one or more microphones, audio data indicative of one or more voice commands associated with controlling operation of the fan motor. The one or more control devices are further configured to control operation of the fan motor based, at least in part, on the audio data.

21 Claims, 6 Drawing Sheets

(51) Int. Cl.
*F24F 11/77* (2018.01)
*F24F 110/20* (2018.01)
*F24F 110/50* (2018.01)

(56) References Cited

U.S. PATENT DOCUMENTS

| | | |
|---|---|---|
| 2002/0007510 A1 | 1/2002 | Mann |
| 2008/0291600 A1* | 11/2008 | Takashima ............. H01G 4/228 361/321.2 |
| 2011/0308265 A1 | 12/2011 | Phannavong et al. |
| 2015/0067805 A1* | 3/2015 | Martin ................ H04L 67/1095 726/7 |
| 2016/0059244 A1 | 3/2016 | Rexach et al. |
| 2017/0122616 A1* | 5/2017 | Calabro ................... F24F 11/30 |
| 2018/0091913 A1* | 3/2018 | Hartung ............... H04R 29/007 |
| 2018/0250430 A1 | 9/2018 | Machovina et al. |
| 2019/0087510 A1* | 3/2019 | Rexach ................ G06F 16/904 |
| 2019/0221958 A1* | 7/2019 | Karc ................. H01R 13/6675 |
| 2022/0049867 A1* | 2/2022 | Rexach .................... F24F 11/58 |

\* cited by examiner

EXHAUST FAN

RELATED APPLICATIONS

The present application claims benefit of priority of U.S. Provisional Application Ser. No. 62/933,674, filed Nov. 11, 2019, which is incorporated herein by reference.

FIELD

The present disclosure relates generally to exhaust fans.

BACKGROUND

Exhaust fans can be used to pull odors, fumes, and moisture from a space, such as a bathroom or other environment (e.g., industrial space). For instance, an exhaust fan can be activated (e.g., turned on) when a user is taking a shower. In this manner, moisture accumulating in the air due to the running shower water can be removed from the bathroom. However, since exhaust fans are often manually switched on and off by the user, instances may occur in which the user forgets to activate the exhaust fan prior to running the shower water. In such instances, moisture accumulating in the air due to the running shower water can be deposited on one or more surfaces (e.g., floor) of the bathroom.

BRIEF DESCRIPTION

Aspects and advantages of embodiments of the present disclosure will be set forth in part in the following description, or may be learned from the description, or may be learned through practice of the embodiments.

In one aspect, an exhaust fan for a space is provided. The exhaust fan includes a vent and a plurality of blades. The exhaust fan further includes a fan motor operatively coupled to the plurality of fan blades. The fan motor is configured to drive rotation of the plurality of fan blades to draw air within the space through the vent. The exhaust fan further includes one or more microphones and one or more sensors. The one or more sensors are configured to detect one or more parameters of the air. The exhaust fan further includes one or more control devices. The one or more control devices are configured to obtain, via the one or more microphones, audio data indicative of one or more voice commands associated with controlling operation of the fan motor. The one or more control devices are further configured to control operation of the fan motor based, at least in part, on the audio data.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the disclosure.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
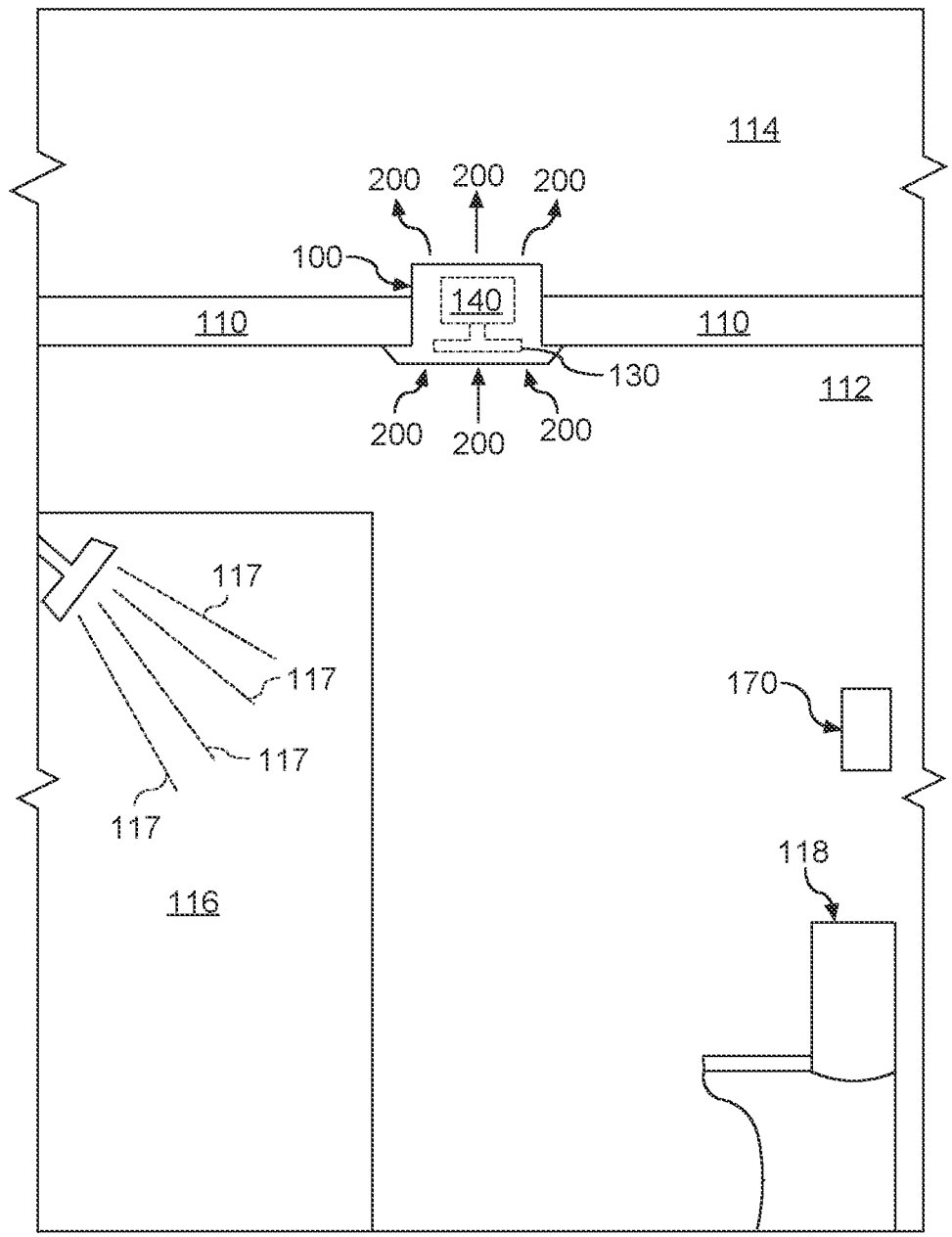
FIG. 1 provides a perspective view of an exhaust fan suspended from a ceiling according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to an exhaust fan for a space, such as a bathroom or industrial environment. The exhaust fan can be used to draw air within the space through a vent of the exhaust fan and can expel the air at a location other than the space.

For example, a fan motor of the exhaust fan can be activated to drive rotation of one or more fan blades of the exhaust fan to remove moisture that accumulates within the air while a shower within the space is being used. As another example, the fan motor can be activated to remove odors present within the space. In this manner, the exhaust fan can ventilate the air within the space as needed. As will be discussed below in more detail, the exhaust fan can be configured to monitor one or more parameters of the air within the space and activate the fan motor when an actual value for the one or more parameters of the air deviate from a setpoint for the one or more parameters.

Although aspects of the present disclosure are discussed with reference to an exhaust fan for a bathroom, those of ordinary skill in the art, using the disclosures provided herein, will understand that the exhaust fans can be used in other spaces (e.g., industrial spaces) without deviating from the scope of the present disclosure.

In some implementations, the exhaust fan can include one or more sensors configured to detect the one or more parameters of the air within the space. For example, the one or more sensors can include a humidity sensor configured to detect a relative humidity of the air within the space. Alternatively or additionally, the one or more sensors can include an air quality sensor (e.g., gas sensor) configured to detect presence of odors or fumes within the air. In this manner, operation of the fan motor can be controlled based, at least in part, data obtained from the one or more sensors to provide improved ventilation of the space.

In some implementations, one or more control devices onboard the exhaust fan or remote relative to the exhaust fan can be configured to obtain data from the one or more sensors (e.g., humidity sensor, air quality sensor, etc.) and can be further configured to determine a shower is ready for a user. For instance, the one or more control devices can be configured to determine the shower is ready when the one or more sensors (e.g., humidity sensor) detect an amount of moisture within the air that is indicative of presence of steam within the space. The one or more control devices can be further configured to provide a notification to indicate the shower is ready. For instance, the one or more control devices can provide the notification to a handheld computing device (e.g., smartphone, tablet, etc.) associated with the user.

In some implementations, the exhaust fan can include one or more microphones. The one or more microphones can be configured to detect one or voice commands associated with a user-request to control operation of the exhaust fan. More specifically, the user request can be associated with controlling one or more components of the exhaust fan. In this manner, operation of the exhaust fan can be controlled without requiring a user to provide a manual input at an input device (e.g., in-wall switch). In some implementations, the one or more voice commands can be associated with controlling operation of the fan motor. For instance, the one or more voice commands can be associated with toggling power to the fan motor.

In some implementations, the fan motor of the exhaust fan can be configurable in a plurality of different modes and/or can be a variable speed fan motor. In particular, the fan motor can rotate the fan blades of the exhaust fan at a different speed when configured in each of the plurality of modes. In such implementations, the one or more voice commands can be associated with selection one of the plurality of modes as a selected mode of operation for the fan motor to adjust a speed at which the fan motor rotates the fan blades of the exhaust fan.

In some implementations, one or more control devices of the exhaust fan can be configured to automatically adjust a speed of the fan motor in response to receiving voice commands so that the voice commands are more audible over the sound associated with operation of the fan motor. For instance, a speed of a variable speed motor can be reduced when the one or more voice commands are detected via the one or more microphones.

In some implementations, the one or more voice commands can be associated with a user-request to play a song or radio station via one or more output devices (e.g., speakers) of the exhaust fan. In this manner, a user can request a song or radio station to be played over the one or more output devices while the user is taking a shower.

In some implementations, the exhaust fan can include one or more motion sensors. The one or more motion sensors can detect motion of a user within the space. In this manner, the one or more motion sensors can detect presence of the user within the space. In implementations in which the exhaust fan is positioned directly above the shower in the space, the one or more motion sensors can be used to detect presence of the user within the shower. In this manner, the data from the one or more motion sensors can be used to determine whether the user has slipped or fallen in the shower. For instance, one or more control devices can be configured to determine the user has fallen or slipped in the shower when a predetermined amount of time lapses since the one or more motion sensors last detected motion of the user.

In some implementations, the one or more control devices can obtain additional data to confirm whether the user has, in fact, slipped or fallen within the shower. For instance, the one or more control devices can obtain data from the one or more microphones since the one or more microphones can detect audible sounds (e.g., shower water running) or verbal cues ("Help") indicative of the user falling or slipping in the shower. When the one or more control devices confirm the user has slipped or fallen in the shower, the one or more control devices can be configured to provide a notification to indicate the user slipped or fell in the shower. For instance the one or more control devices can be configured to provide the notification to one or more person included in a notification tree.

In some implementations, the exhaust fan can include a first communication interface and a second communication interface. The first communication interface can facilitate communication between the exhaust fan and one or more peripheral devices over a first network (e.g., local network). The second communication interface can facilitate communication between the exhaust fan and one or more remote computing devices over a second network (e.g., external network) that is different than the first network. In this manner, the exhaust fan can facilitate communication between the one or more peripheral devices on the first network and the one or more computing devices on the second network. In some implementations, the one or more control devices can be configured to communicate with remote devices over a single network and/or direct peer-to-peer communication.

Example communication technologies and/or protocols can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, HaLow, cellular communication, LTE, low-power wide area networking, VSAT, Ethernet, MoCA (Multimedia over Coax Alliance), PLC (Power-line communication), DLT (digital line transmission), etc. Other suitable communication technologies and/or protocols can be used without deviating from the scope of the present disclosure.

In some implementations, the one or more control devices can be configured to provide one or more control signals over the local network to control operation of one or more peripheral devices on the local network based, at least in part, on data obtained from the sensors or microphones of the exhaust fan. For example, the one or more control devices can provide one or more control signals over the local network to toggle power to a light source that is located within the space and separate from the light source of the exhaust fan and/or the light indicator of the exhaust fan. More specifically, the one or more control devices can provide the one or more control signals over the local network to the light source in response to obtaining data from the one or more motion sensors that is indicative of presence of the user within the space. It should be appreciated that the light source that is separate from a light source of the exhaust fan can be located at any suitable location within the space. For instance, in some implementations, the light source can be associated with a vanity mirror located in the space. Alternatively, the light source can be associated with a lighting fixture located in the space.

In some implementations, the exhaust fan can be in communication with a remote computing device over the external network. More specifically, the remote computing device can be a hand-held computing device (e.g., smartphone, tablet, etc.) associated with the user. In such implementations, the one or more control devices of the exhaust fan can be configured to access a mobile application implemented on the hand-held computing device to obtain data indicative of an alarm clock setting. More specifically, the alarm clock setting can be indicative of a time of day at which the user intends to wake up.

Based on the data indicative of the alarm clock setting, the one or more control devices can be configured to control operation of one or more heating elements operable to heat a floor of the space. More specifically, the one or more control devices can be configured to activate the one or more heating elements a predetermined amount of time before the alarm on the mobile computing device goes off. In this manner, the floor of the first space can be heated before the user enters the space.

In some implementations, the exhaust fan can include one or more light indicators, such as a light ring and/or a light bar. For instance, the exhaust fan can include a ring of light emitting diodes (LEDs) or other light sources. In some implementations, the light ring can be controlled in response to various actions, such as responsive to voice commands. For instance, in some implementations, the light ring can be controlled to be displayed in response to a voice command received via the one or more microphones. Once the voice command is completed, the light ring can be turned off or no longer illuminated. In some implementations, various different animation sequences can be displayed in response to detection of different voice commands or other user input. For instance, a circular animation configured to mimic a spinning circle can be displayed in response to detection of a voice command.

In some implementations, the exhaust fan can include a night light. The night light can provide ambient lighting at night. The color and/or brightness of the night light can be specified as part of settings associated with the exhaust fan (e.g., via an application implemented on a user device).

The exhaust fan according to the present disclosure can provide numerous technical benefits. For instance, the one or more microphones of the exhaust fan allow a user to control operation of the exhaust fan without having to provide a manual user-input at an input device (e.g., in-wall switch). In addition, the exhaust fan can act as a bridge between one or more peripheral devices on a local network and one or more computing devices on an external network. In this manner, the exhaust fan can obtain data from a user device (e.g., smartphone, tablet, etc.) on the external network and control operation of the one more peripheral devices on the local network.

Referring now to the FIGS., FIG. 1 depicts an exhaust fan 100 according to example embodiments of the present disclosure. As shown, the exhaust fan 100 can be disposed within a recess defined by a ceiling 110 separating a first space 112 (e.g., positioned beneath the ceiling 110) from a second space 114 (e.g., positioned above the ceiling 110). In some implementations, the first space 112 can be a bathroom having a shower 116 and a toilet 118. It should be appreciated, however, that the exhaust fan 100 according to the present disclosure can be used in any suitable space requiring ventilation.

Although the exhaust fan 100 is depicted as being located within ceiling 110 such that the exhaust fan 100 is located at or near a middle of the first space 112, it should be appreciated that the exhaust fan 100 can be positioned at any suitable location. For instance, in some implementations, the exhaust fan 100 can be positioned within the ceiling 110 such that the exhaust fan 100 is located directly above the shower 116 located in the first space 112. Alternatively, the exhaust fan 100 can be positioned within the ceiling 110 such that the exhaust fan 100 is located directly above the toilet 119 located in the first space 112.

As shown, the exhaust fan 100 can include a plurality of fan blades 130 (shown in phantom). Furthermore, the exhaust fan 100 can further include a fan motor 140 (also shown in phantom). The fan motor 140 can be configured to receive an input power from a power source, such as an alternating current (AC) power source or a direct current (DC) power source. Furthermore, the fan motor 140 can be operatively coupled to the fan blades 130. In this manner, the fan motor 140 can convert the input power into mechanical energy needed to drive rotation of the fan blades 130.

As the fan blades 130 rotate, air 200 within the first space 112 can be drawn through a vent 150 (FIG. 2) of the exhaust fan 100. In some implementations, the exhaust fan 100 can be activated while a user is taking a shower. In this manner, moisture (e.g., water vapor) accumulating in the air 200 due to the shower water 117 can be removed from the first space 112 and thereby prevent fog from forming within the first space 112. Alternatively or additionally, the exhaust fan 100 can be activated to remove fumes or odors within the air 200 and associated with use of the toilet 118 by the user. In this manner, In some implementations, the exhaust fan 100 can expel the air 200 into the second space 114. For instance, a second exhaust fan (e.g., attic fan) positioned within the second space 114 can be configured to draw air 200 within the second space 114 through a vent of the second exhaust fan and expel the air 200 at a location that is different than the first space 112 and the second space 114. In alternative implementations, the exhaust fan 100 can expel the air 200 into one or more air ducts (not shown) disposed within the second space 114. In this manner, the air 200 can be routed through the one or more air ducts and expelled at a location that is different than the first space 112 and the second space 114.

In some implementations, the fan motor 140 can be a configurable in a plurality of different modes. The fan motor 140 can be configured to rotate the fan blades 130 at a different speed when configured in each of the plurality of modes. For instance, in some implementations, the plurality of modes can include a first mode (e.g., low), a second mode (e.g., medium), and a third mode (e.g., high). When the fan motor 140 is configured in the first mode, the fan motor 140 can rotate the fan blades 130 at a first speed. When the fan motor 140 is configured in the second mode, the fan motor 140 can rotate the fan blades 130 at a second speed that is faster than the first speed. When the fan motor 140 is configured in the third mode, the fan motor 140 can rotate the fan blades 130 at a third speed that is faster than the first speed and the second speed. It should be appreciated that the fan motor 140 can be configurable in more or fewer modes.

In some implementations, the exhaust fan 100 can include a light source 160 operable to illuminate the first space 112. It should be appreciated that the light source 160 can include any suitable type of light source. For instance, in some implementations, the light source 160 can include an array of light emitting diodes (LEDs). Alternatively or additionally, the light source 160 can be a dimmable light source.

In some implementations, operation of the exhaust fan 100 can be controlled via a control system 170. More specifically, the control system 170 can include a wall-switch that can be manipulated to selectively couple the fan motor 140 to the power source. In this way, the control system 170 can be used to selectively activate (e.g., turn on) or deactivate (e.g., turn off) the fan motor 140 to control rotation of the fan blades 130. Furthermore, in some implementations, the control system 170 can be configured to control operation of the light source 160 of the exhaust fan 100. For instance, the control system 170 can be used to selectively activate or deactivate the light source 160.

Figure 3:
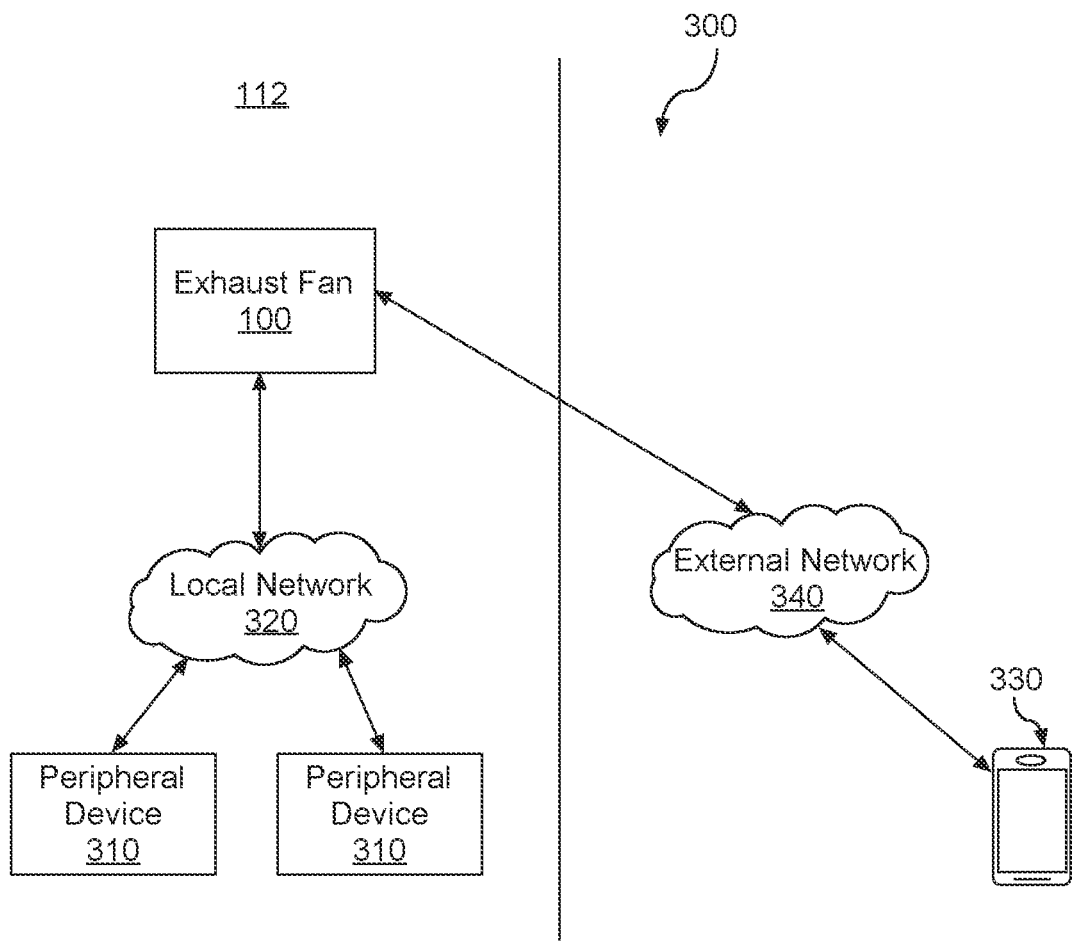
FIG. 3 provides a system for controlling operation of one or peripheral devices on a local network according to example embodiments of the present disclosure.

Referring now to FIG. 3, components of the exhaust fan 100 are depicted according to example embodiments of the present disclosure. As shown, the exhaust fan 100 can include one or more sensors 210 configured to detect one or more parameters of the air 200 (FIG. 1) within the first space 112 (FIG. 1). In some implementations, the one or more sensors 210 can include a humidity sensor configured to detect a relative humidity of the air 200 within the first space 112. Alternatively or additionally, the one or more sensors 210 can include a gas sensor configured to detect odors within the first space 112.

The exhaust fan 100 can include one or more microphones 220 operable to detect audible sounds occurring within the first space 112. For instance, the one or more microphones 220 can detect one or more voice commands associated with a user-request to control operation of the exhaust fan 100. In this manner, operation of the exhaust fan 100 can be controlled without requiring the user to provide a manual-input at an in-wall power switch located within the first space 112.

In some implementations, the user-request can be associated with activating (e.g., turning on) or deactivating (e.g., turning off) the fan motor 140. Furthermore, in implementations in which the fan motor 140 is configurable in the plurality of different modes, the user-request can be associated with selecting one of the plurality of modes as a selected mode of operation for the fan motor 140 to adjust (e.g., increase, decrease) a speed at which the fan motor 140 rotates the fan blades 130 (FIG. 1) of the exhaust fan 100.

It should be appreciated that any suitable type of noise-cancellation technology (e.g., active noise control, passive noise control) can be incorporated into the exhaust fan 100 to improve detection of the one or more voice commands spoken by the user to implement the user-request associated with controlling operation of the exhaust fan 100.

In some implementations, the exhaust fan 100 can include one or more motion sensors 230. The one or more motion sensors 230 can be configured to detect presence of a user within the first space 112. Furthermore, in implementations in which the exhaust fan 100 is positioned within the ceiling 110 (FIG. 1) such that the exhaust fan 100 is positioned directly above the shower 116 (FIG. 1) located within the first space 112, the one or more motion sensors 230 can be used to detect occurrence of a user slipping or falling within the shower 116.

It should be appreciated that that the one or more motion sensors 230 can include any suitable type of sensor configured to detect motion of an object (e.g., person). For instance, in some implementations, the one or more motion sensors 230 can include a passive infrared sensor.

In some implementations, the exhaust fan 100 can include one or more heating elements 232. The one or more heating elements 232 can be configured to heat air that is directed into the first space 112 via a blower 234 of the exhaust fan 100. The blower 234 can be configured to direct air into the first space 112 via the vent 150 of the exhaust fan 100. In some implementations, the one or more heating elements 232 can be positioned between the vent 150 and the blower 234 such that the air directed by the blower 234 passes over the one or more heating elements 232 prior to exiting the exhaust fan 100 via the vent 150 thereof.

In some implementations, the exhaust fan 100 can include one or more output devices 236 configured to emit audio data. For instance, the one or more output devices 236 can include one or more speakers. In some implementations, audio data (e.g., music, talk radio, etc.) can be output via the one or more speakers in response to the one or more microphones 220 detecting one or more voice commands associated with a user-request to play audio data.

In some embodiments, the exhaust fan 100 can include an indicator light 238. For instance, the exhaust fan 100 can include a ring of light emitting diodes (LEDs) or other light sources. In some embodiments, the indicator light 238 can be controlled in response to various actions, such as responsive to voice commands. For instance, in some embodiments, the indicator light 238 can be controlled to be displayed in response to a voice command received via the one or more microphones. Once the voice command is completed, the indicator light 238 can be turned off or no longer illuminated. In some embodiments, various different animation sequences can be displayed in response to detection of different voice commands or other user input. For instance, a circular animation configured to mimic a spinning circle can be displayed in response to detection of a voice command.

As shown, the exhaust fan 100 can include one or more control devices 240. The one or more control devices 240 can be configured to control operation of one or more components of the exhaust fan 100. For instance, the one or more control devices 240 can be configured to provide one or more control signals associated with controlling operation of the fan motor 140. For instance, the one or more control signals can be associated with activating (e.g., turning on) or deactivating (e.g., turning off) the fan motor 140. Alternatively, the one or more control signals can be associated with configuring the fan motor 104 in one of a plurality of modes of operation of the fan motor 140 to adjust (e.g., increase, decrease) a speed at which the fan motor 140 rotates the fan blades 130 (FIG. 1). Furthermore, in implementations in which the exhaust fan 100 includes the light source 160, the one or more control devices 240 can be configured to provide one or more control signals associated with controlling operation of the light source 160.

In some implementations, the one or more control devices 240 can be configured to obtain data indicative of one or more parameter of the air 200 (FIG. 1) within the first space 112 via the one or more sensors 210 of the exhaust fan 100. The one or more control devices 240 can be configured to process the data and control operation of the fan motor 140 based, at least in part, on the data. For instance, the one or more control devices 240 can be configured to activate (e.g., turn on) the fan motor 140 when the data indicates a relative humidity of the air 200 within the first space 112 is greater than a setpoint for the first space 112. Furthermore, in some implementations, the one or more control devices 240 can be configured to operate the fan motor 140 until additional data obtained from the one or more sensors 210 of the exhaust fan 100 indicates the relative humidity of the air 200 within the first space is at or below the setpoint for the first space 112.

As discussed above, the fan motor 140 can, in some implementations, be configurable in a plurality of different modes. In such implementations, the one or more control devices 240 can be configured to determine one of the plurality of modes as a selected mode of operation for the fan motor 140 based, at least in part, on a time of a day when the one or more control devices 240 determine the relative humidity of the air is above the setpoint for the first space 112. For instance, if the one or more control devices 240 determine the relative humidity of the air within the first space 112 is above the setpoint during the early morning hours (e.g., 10 PM to 6 AM), the one or more control devices 240 can configure the fan motor 140 in a mode in which the fan motor 140 rotates the fan blades 130 at a slower speed compared to every other mode of the fan motor 140. In this manner, noise associated with operation of the fan motor 140 can be reduced during the early morning hours.

Alternatively, if the one or more control devices 240 determine the relative humidity of the air within the first space 112 is above the setpoint during another portion of the day, such as the afternoon (e.g., 12 PM to 5 PM), the one or more control devices 240 can configure the fan motor 140 in a mode in which the fan motor 140 rotates the fan blades at a faster speed compared to every other mode of the fan motor 140. In this manner, the excess moisture in the air can be more quickly removed from the first space 112 such that the relative humidity returns to a value that is at or below the setpoint.

In some implementations, the one or more control devices 240 can be configured to obtain data indicative of presence of a user within the shower 116 (FIG. 1) located within the first space 112. The one or more control devices 240 can be further configured to determine the user has slipped or fallen within the shower 116 when a predetermined amount of time lapses since the one or more motion sensors 230 last detected presence of the user within the shower 116.

In some implementations, the one or more control devices 240 can obtain data from the one or more microphones 220 to confirm whether or not the user has, in fact, slipped or fallen in the shower 116. For instance, the one or more control devices 240 can be configured to confirm the user has slipped or fallen in the shower 116 when the predetermined amount of time lapses since presence of the user was last detected and the one or more microphones 220 detect audible sounds indicative of shower water running or verbal cues (e.g., "Help"). In such implementations, the one or more control devices 240 of the exhaust fan 100 can be configured to provide a notification to indicate the user slipped or fell in the shower. For instance the one or more control devices 240 can be configured to provide the notification to one or more person included in a notification tree. It should be appreciated that the notification tree can be stored at any suitable location. For instance, in some implementations, the notification tree can be stored in memory associated with the one or more control devices 240 of the exhaust fan 100.

In some implementations, the one or more control devices 240 can be configured to obtain audio data indicative of one or more voice commands detected by the one or more microphones 220 of the exhaust fan 100. As discussed above, the one or more voice commands can be associated with a user-request to control operation of the exhaust fan 100. In some implementations, the one or more control devices 240 can be configured to process the one or more voice commands locally to determine the user-request. Furthermore, the one or more control devices 240 can be further configured to provide one or more control signals to the fan motor 140 and/or the light source 160 depending on the user-request.

In alternative implementations, the one or more control devices 240 can be configured to provide the audio data indicative of the one or more voice commands to a remote computing device (e.g., server, cloud computing device, etc.) for processing. Furthermore, the remote computing device can be configured to provide one or more wireless signals to the one or more control devices 240 of the exhaust fan 100. The one or more control devices 240 can be configured to demodulate the one or more wireless signals to obtain data indicative of the user-request and can be further configured to provide one or more control signals to the fan motor 140 and/or the light source 160 based, at least in part, on the data indicative of the user request.

In some implementations, the exhaust fan can include a first communication interface 250 and a second communication interface 252. The first communication interface 250 can facilitate communication between the exhaust fan 100 and one or more peripheral devices on a local network. The second communication interface 252 can facilitate communication between the exhaust fan 100 and one or more remote devices on an external network. In this manner, the exhaust fan 100 can facilitate communication between the one or more peripheral devices on the local network and the one or more remote devices on the external network.

Figure 4:
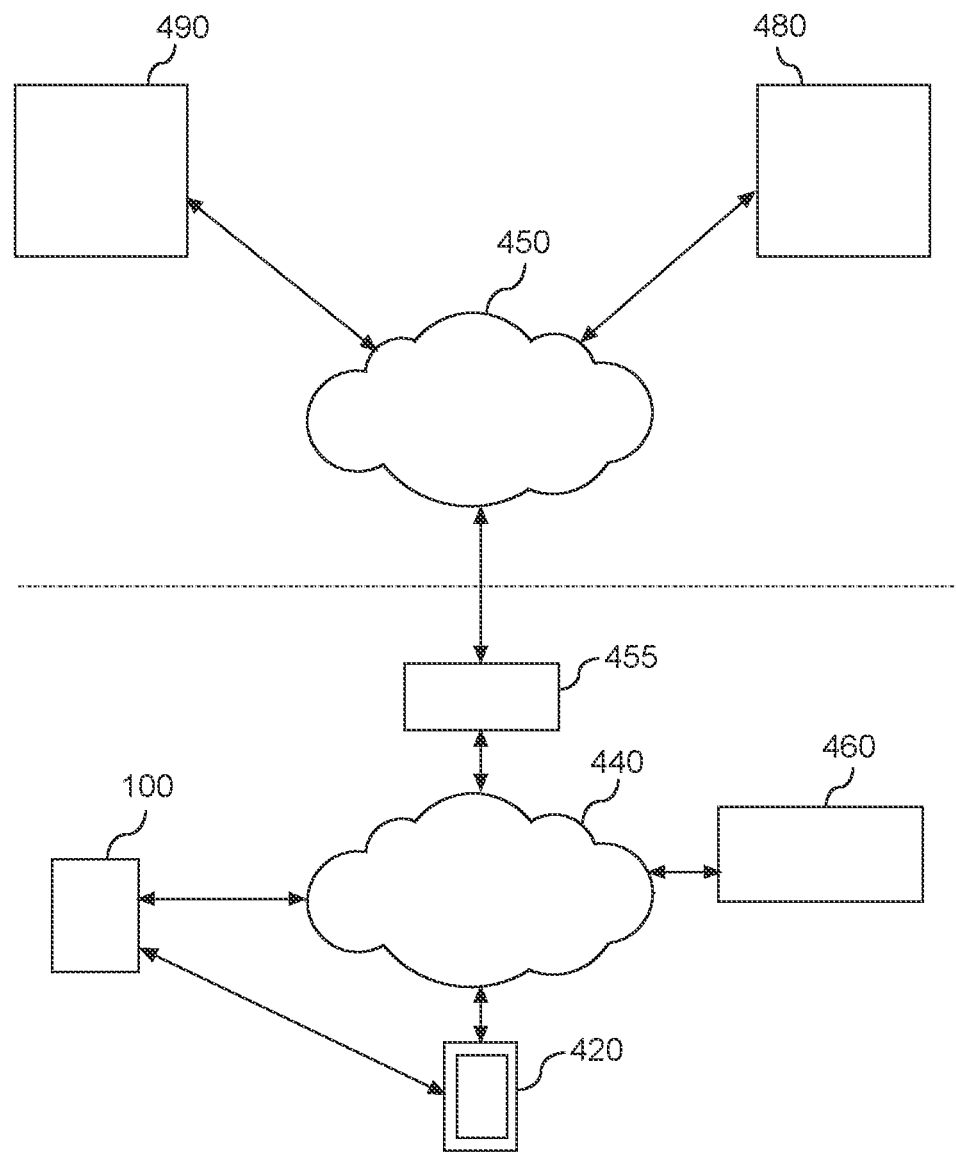
FIG. 4 provides a system for controlling operation of an exhaust fan according to example embodiments of the present disclosure.

Referring now to FIG. 4, a system 300 for controlling operation of one or more peripheral devices 310 on a local network 320 within the first space 112 is provided according to example embodiments of the present disclosure. In some implementations, the local network 320 can be based on the Bluetooth protocol. It should be appreciated, however, that the local network 320 can be based on any suitable wireless protocol.

In some implementations, the one or more control devices 240 (FIG. 2) of the exhaust fan 100 can be configured to provide one or more control signals over the local network 320 to control operation of one or more of the peripheral devices 310. For instance, the one or more control devices 240 can provide one or more control signals over the local network 320 to toggle power to a light source that is located within the first space 112 and separate from the light source 160 of the exhaust fan 100. More specifically, the one or more control devices 240 can provide the one or more control signals over the local network 320 to the light source in response to obtaining data from the one or more motion sensors 230 that indicates presence of the user within the first space 112. It should be appreciated that the light source that is separate from the light source 160 (FIG. 2) of the exhaust fan 100 can be located at any suitable location within the first space 112. For instance, in some implementations, the light source can be associated with a vanity mirror located in the first space 112. Alternatively, the light source can be associated with a lighting fixture located in the first space 112.

In some implementations, the exhaust fan 100 can be in communication with one or more remote computing devices 330 (e.g., smartphone, tablet, etc.) over an external network 340. In some implementations, the external network 340 can be based on the Wifi protocol. It should be appreciated, however, that the local network 320 can be based on any suitable wireless protocol. As will be discussed below in more detail, the one or more control devices 240 of the exhaust fan 100 can be configured to control operation of the one or more peripheral devices 310 based, at least in part, on data obtained from the one or more remote computing devices 330 via the external network 340.

In some implementations, the one or more remote computing devices 330 can be a mobile computing device associated with the user. In such implementations, the one or more control devices 240 of the exhaust fan 100 can be configured to obtain data indicative of an alarm clock setting associated with a mobile application implemented the mobile computing device. Based on the data indicative of the alarm clock setting, the one or more control devices 240 of the exhaust fan 100 can be configured to control operation of one or more heating elements configured to heat a floor of the first space 112. More specifically, the one or more control devices 240 can be configured to activate the one or more heating elements a predetermined amount of time before the alarm on the mobile computing device is set to activate. In this manner, the floor of the first space 112 can be heated prior to the user entering the first space 112 to use the shower 116 and/or toilet 119.

Figure 6:
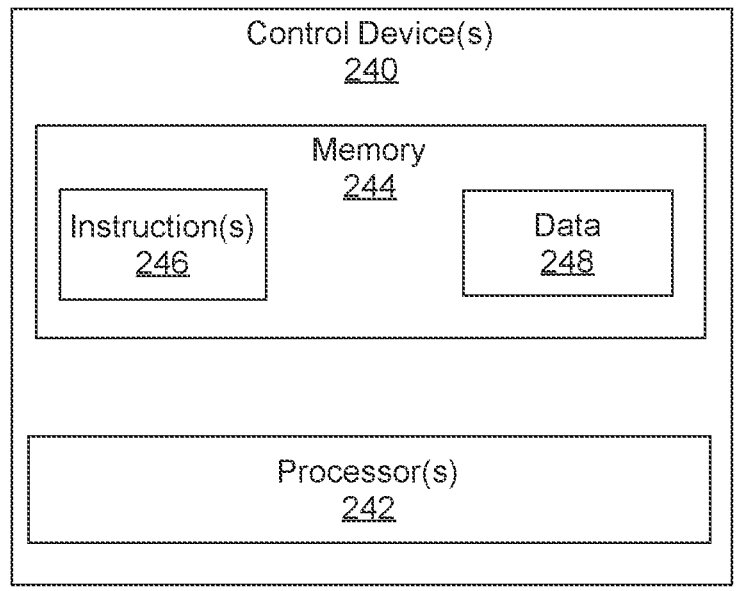
FIG. 6 provides a block diagram of components of a control device according to example embodiments of the present disclosure.

Referring now to FIG. 6, a system 400 for controlling operation of an exhaust fan is provided according to example embodiments of the present disclosure. As shown, the system 400 can include the exhaust fan 100 discussed above with reference to FIGS. 1-3. The one or more microphones 220 (FIG. 2) of the exhaust fan 100 can, as discussed above, detect audio data indicative of one or more voice commands associated with controlling operation of one or more components of the exhaust fan 100. For instance, the one or more voice commands can be associated with toggling power to the fan motor 140 (FIG. 2) and/or the light source 160 (FIG. 2) of the exhaust fan 100. In some implementations, the exhaust fan 100 can be in communication with user devices 420, 460. For instance, user devices 420, 460 can include one or more smartphones, laptops, desktops, tablets, wearable devices, media devices, displays with one or more processors, or other suitable devices. For instance, in some implementations, the exhaust fan 100 can be in communication with the user devices 420, 460 via a direct communication link (e.g., direct wired or wireless communication link) or via a network, such as local area network 440. The direct communication link can be implemented, for instance, using Bluetooth low energy or other suitable communication protocol. In some implementations, a user can control, view information, and/or specify one or more settings associated with the exhaust fan 100 via a graphical user interface implemented on a display of the user device 420, 460. For instance, a user can access an application implemented on the user device 420, 460. The application can present a graphical user interface on a display of the user device 420, 460. In this manner, a user can interact with the graphical user interface to control operation of the exhaust fan 100.

The local area network 440 can be any suitable type of network or combination of networks that allows for communication between devices. In some embodiments, the local area network 440 can include one or more of a secure network, Wi-Fi network, Bluetooth network, IoT network, mesh network, one or more peer-to-peer communication links, and/or some combination thereof, and can include any number of wired or wireless links. Communication over the local area network 440 can be accomplished, for instance, via a communication interface using any type of protocol, protection scheme, encoding, format, packaging, etc.

As shown, the system 400 can include a gateway 455 that can allow access to a wide area network 450. The wide area network 450 can be, for instance, the Internet, cellular network, or other network, and can include any number of wired or wireless links. Communication over the wide area network 450 can be accomplished, for instance, via a communication interface using any type of protocol, protection scheme, encoding, format, packaging, etc. As shown, the exhaust fan 100 can communicate information over the wide area network 450 to remote computing system 480 and 490 and other remote computing devices via the gateway 455.

In some implementations, the remote computing system 480 can be associated with a cloud computing platform for implementation of one or more services (e.g., digital assistant server) for the exhaust fan 100. Data collected by the cloud computing platform can be processed and stored and provided, for instance, to the user device 420 (e.g., for presentation in a graphical user interface).

In some implementations, audio data collected via the one or more microphones 220 of the exhaust fan 100 can be communicated to the remote computing system 490 for processing of voice commands. For instance, in some implementations, the one or more voice commands can be associated with toggling power to the fan motor 140 (FIG. 2) of the exhaust fan 100. In some implementations, the one or more voice commands can be associated with adjusting a speed at which the fan motor 140 rotates the fan blades 130 (FIG. 1). Alternatively, the one or more voice commands can be associated with toggling power to the light source 160 (FIG. 2) of the exhaust fan 100.

In some implementations, data responsive to the one or more voice commands can be communicated to the exhaust fan 100. More specifically, one or more wireless signals can be provided to the second communication interface 252 of the exhaust fan 100. The one or more control devices 240 of the exhaust fan 100 can be configured to demodulate the one or more wireless signals to obtain data indicative of the one or more voice commands detected by the one or more microphones 220 of the exhaust fan 100. Furthermore, the one or more control devices 240 of the exhaust fan 100 can be configured to provide one or more control signals to one or more components of the exhaust fan 100 based, at least in part, on the data associated with the one or more wireless signals. For instance, the one or more control signals can be provided to the fan motor 140 (FIG. 2) and/or the light source 160.

The remote computing system 480 and 490 can include one or more computing devices. The one or more computing devices can include one or more processors and one or more memory devices. The remote computing systems 480 and 490 can be distributed such that its components are located in different geographic areas. The technology discussed herein refers to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 5:
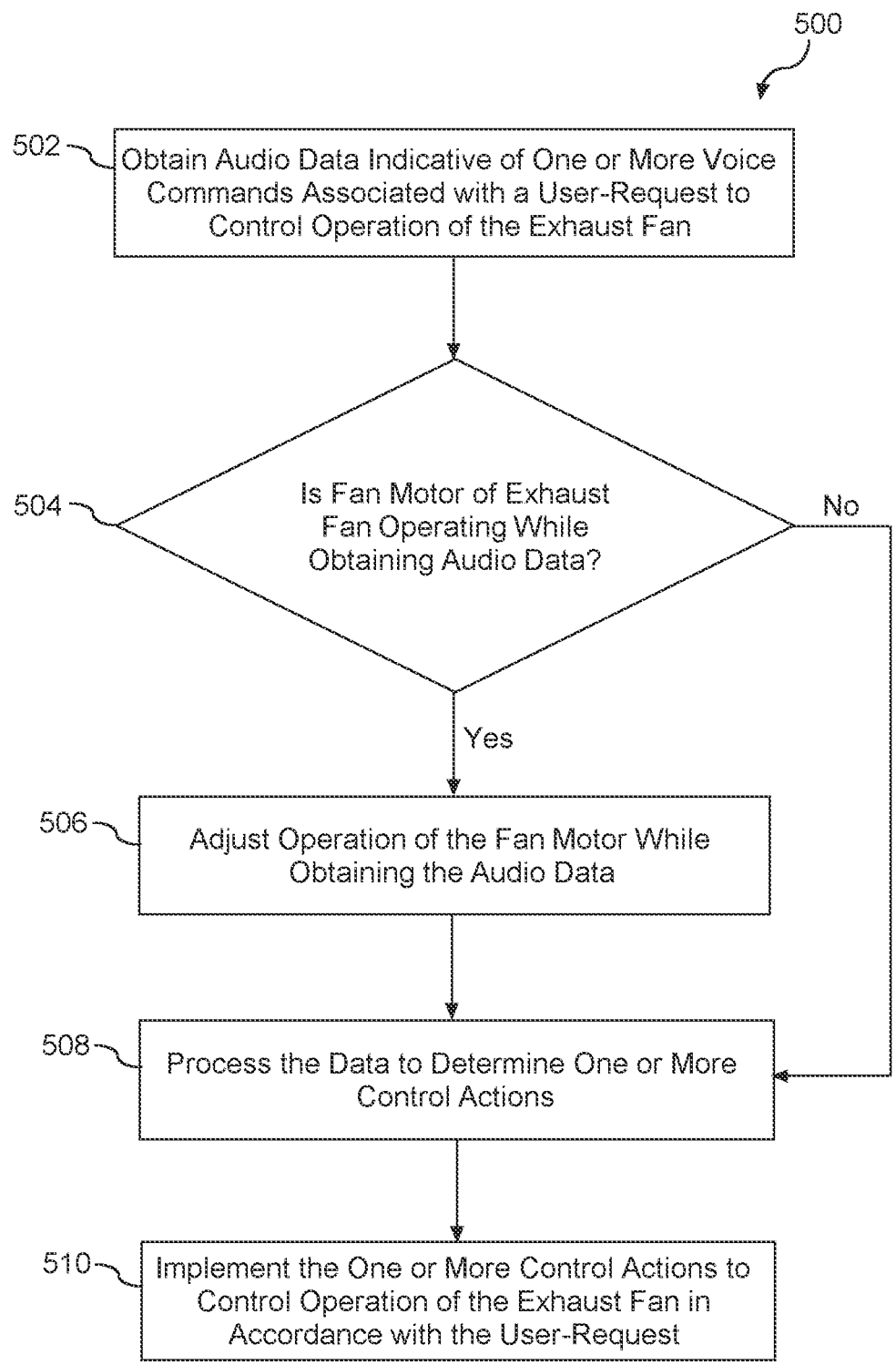
FIG. 5 provides flow diagram of a method for controlling operation of an exhaust fan according to example embodiments of the present disclosure.

Referring now to FIG. 5, a flow diagram of a method 500 for controlling operation of an exhaust fan is provided according to example embodiments of the present disclosure. In general, the method 500 will be discussed herein with reference to the exhaust fan described above with reference to FIGS. 1-3. However, it should be appreciated by those of ordinary skill in the art that the disclosed method 500 can generally be implemented with ceiling fans having any other suitable configuration. In addition, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (502), the method 500 can include obtaining, by one or more control devices, audio data indicative of one or more voice commands associated with a user-request to control operation of an exhaust fan within a space. The audio data can, as discussed above, be detected via one or more microphones of the exhaust fan. In some implementations, the one or more voice commands can be associated with controlling operation of the fan motor of the exhaust fan. More specifically, the one or more voice commands can be associated with toggling power to the fan motor. In some implementations, the one or more voice commands can be associated with a user-request to select one of a plurality of modes as a selected mode of operation of the fan motor to adjust a speed at which the fan motor rotates fan blades of the exhaust fan.

At (504), the method 500 can include determining, by the one or more control devices, whether the fan motor of the exhaust fan is operating while obtaining the audio data at (502). When the one or more control devices determine the fan motor is operating while obtaining the data indicative of the one or more voice commands, the method 500 proceeds to (506). Otherwise the method proceeds to (508)

At (506), the method 500 can include adjusting, by the one or more control devices, operation of a fan motor of the exhaust fan while obtaining the audio data indicative of the one or more voice commands at (502). In some implementations, adjusting operation of the fan motor can include reducing a speed at which the fan motor rotates the fan blades. In this manner, noise associated with operation of the fan motor can be reduced while obtaining the one or more voice commands. In some implementations, the one or more control devices can be configured to temporarily deactivate (e.g., turn off) the fan motor while the one or more voice commands are being obtained.

At (508), the method 500 can include processing, by the or more control devices, the data obtained at (502) to determine to determine one or more control actions based on the voice command or audio data received at the exhaust fan. The control actions can include, for instance, controlling power delivery to one or more components (e.g., fan motor, light source, etc.) of the exhaust fan, playing back a voice response to a user, playing music requested by a user, or other suitable control action. At (510), the method 500 can include implementing, by the one or more control devices, the control action.

FIG. 6 illustrates one embodiment of suitable components of the one or more control devices 240. As shown, the one or more control devices 240 can include one or more processors 242 configured to perform a variety of computer-implemented functions. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

Figure 2:
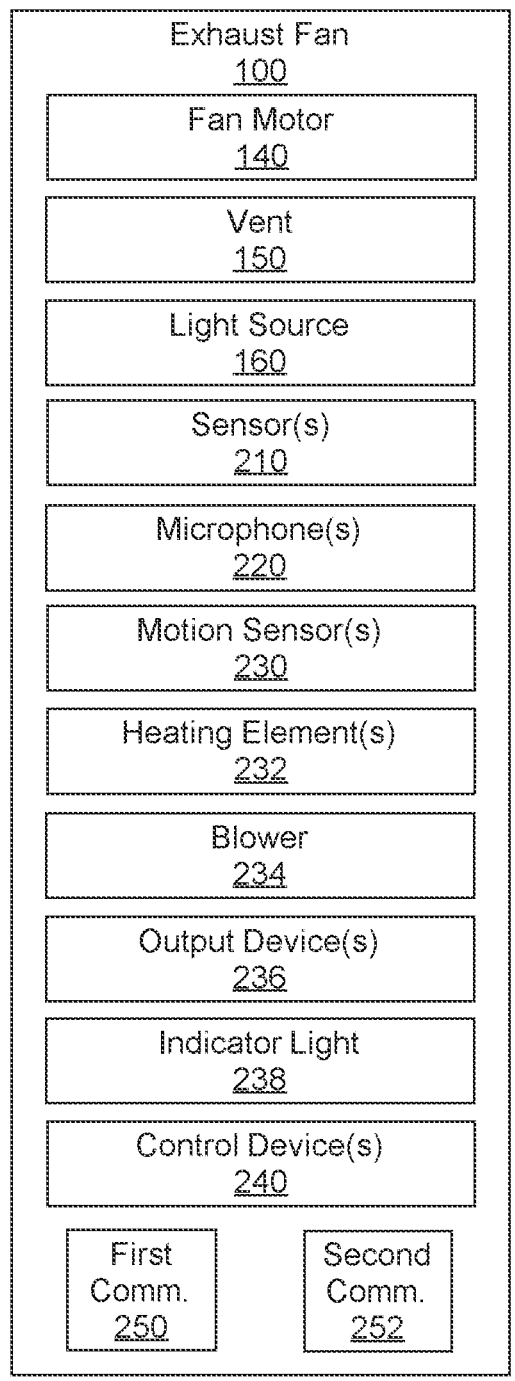
FIG. 2 provides a block diagram of components of the exhaust fan according to example embodiments of the present disclosure.

In addition, the one or more control devices 240 can include a memory device 244. Examples of the memory device 244 can include computer-readable media including, but not limited to, non-transitory computer-readable media, such as RAM, ROM, hard drives, flash drives, or other suitable memory devices. The memory device 244 can store information accessible by the processor(s) 242, including computer-readable instructions 246 that can be executed by the processor(s) 242. The computer-readable instructions 206 can be any set of instructions that, when executed by the processor(s) 242, cause the processor(s) 242 to perform operations. The computer-readable instructions 246 can be software written in any suitable programming language or can be implemented in hardware. In some example embodiments, the computer-readable instructions 246 can be executed by the control device(s) 240 to perform operations, such as controlling operation of the exhaust fan 100 (FIG. 2). The memory device 244 can further store data 248 that can be accessed by the control device(s) 240. In example embodiments, the data 248 can include one or more setpoints associated with one or parameters (e.g., relative humidity) of air within the space.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An exhaust fan for a space, the exhaust fan comprising:
a vent;
a plurality of fan blades;
a fan motor operatively coupled to the plurality of fan blades, the fan motor configured to drive rotation of the plurality of fan blades to draw air within the space through the vent;
one or more sensors configured to detect one or parameters of the air;
one or more microphones;
a first communication interface configured to provide communication between the exhaust fan and a plurality of peripheral devices over a local network; and
a second communication interface configured to provide communication between the exhaust fan and an external network; and
one or more control devices configured to:
obtain, via the one or more microphones, audio data indicative of one or more voice commands associated with controlling operation of the fan motor; and
control operation of the fan motor based, at least in part, on the audio data;
obtain, via the external network, data indicative of an alarm clock setting associated with a user; and
provide, via the local network, one or more control signals associated with controlling operation of one or more heating elements configured to heat a floor of the space based, at least in part, on the data indicative of the alarm clock setting.

2. The exhaust fan of claim 1, further comprising:
one or more speakers configured to emit audio data.

3. The exhaust fan of claim 1, wherein the one or more sensors comprise at least one of a humidity sensor and an air quality sensor.

4. The exhaust fan of claim 1, wherein the one or more control devices are further configured to:
obtain data indicative of the one or more parameters of the air; and
control operation of the fan motor based, at least in part, on the data indicative of the one or more parameters.

5. The exhaust fan of claim 1, wherein when the data indicates a relative humidity of the air within the space is greater than a setpoint for the space, the one or more control devices are configured to operate the fan motor until the data indicates the relative humidity of the air within the space is at or below the setpoint.

6. The exhaust fan of claim 1, further comprising:
one or more motion sensors configured to detect presence of a user within the space.

7. The exhaust fan of claim 6, wherein the one or more motion sensors comprise a passive infrared (PIR) sensor.

8. The exhaust fan of claim 6, wherein:
the exhaust fan is positioned directly above a shower in the space; and
the one or more control devices are configured to:
  obtain, via the one or more motion sensors, data indicative of presence of the user within the shower;
  determine the user has fallen within the shower when a predetermined amount of time lapses without the one or more motion sensors detecting presence of the user; and
  provide a notification indicative of the user falling within the shower.

9. The exhaust fan of claim 1, wherein the fan motor is configurable in a plurality of modes, the fan motor configured to operate a different speed when configured in each of the plurality of modes.

10. The exhaust fan of claim 9, wherein the one or more voice commands are indicative of user-selection of one of the plurality of modes as a selected mode of operation for the fan motor.

11. The exhaust fan of claim 9, wherein the one or more control devices are further configured to:
obtain data indicative of a time of a day;
determine one of the plurality of modes as a selected mode of operation for the fan motor based, at least in part, on the time of day; and
configure the fan motor in the selected mode.

12. The exhaust fan of claim 1, wherein:
the local network comprises a Bluetooth network; and
the external network comprises a Wifi network or a cellular network.

13. The exhaust fan of claim 1, wherein the one or more control devices are further configured to:
activate the one or more heating elements configured to heat a floor of the space a predetermined amount of time before the alarm clock setting.

14. The exhaust fan of claim 1, further comprising:
a light indicator comprising a plurality of LED devices, wherein the one or more control devices are configured to activate the light indicator.

15. The exhaust fan of claim 14, further comprising:
a light source that is separate from the light indicator, the light source configured to illuminate the space.

16. The exhaust fan of claim 1, further comprising:
a blower configured to direct air into the space;
one or more heating elements configured to heat the air prior to being directed into the space.

17. A method for controlling operation of an exhaust fan for a space, the method comprising:
obtaining, by one or more control devices, audio data indicative of one or more voice commands associated with a user request to control operation of the exhaust fan;
determining, by the one or more control devices, one or more control actions based, at least in part, on data;
implementing, by the one or more control devices, the one or more control actions to control operation of the exhaust fan
obtaining, via a first communication interface in communication with an external network, data indicative of an alarm clock setting associated with a user; and
providing, via a second communication interface in communication with a local network, one or more control signals associated with controlling operation of one or more heating elements configured to heat a floor of the space based, at least in part, on the data indicative of the alarm clock setting.

18. The method of claim 17, wherein implementing the one or more control actions to control operation of the exhaust fan comprises playing, by the one or more control devices, audio data over one or more speakers of the exhaust fan.

19. The method of claim 17, wherein implementing the one or more control actions to control operation of the exhaust fan comprises providing, by the one or more control devices, one or more control signals associated with toggling power to a fan motor of the exhaust fan.

20. The method of claim 17, further comprising:
adjusting, by the one or more control devices, operation of a fan motor of the exhaust fan while obtaining the audio data indicative of the one or more voice commands associated with the user request.

21. The method of claim 20, wherein adjusting operation of the fan motor while obtaining the audio data comprises reducing, by the one or more control devices, a speed at which the fan motor rotates fan blades of the exhaust fan to reduce noise associated with operation of the fan motor.

* * * * *